(12) United States Patent
Taban et al.

(10) Patent No.: US 8,862,896 B2
(45) Date of Patent: Oct. 14, 2014

(54) DATA PROTECTION USING KEY TRANSLATION

(75) Inventors: Gelareh Taban, Sunnyvale, CA (US); Filip Paun, Menlo Park, CA (US); Benoit Chevallier-Mames, Paris (FR); Augustin J. Farrugia, Cupertino, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 913 days.

(21) Appl. No.: 12/961,374

(22) Filed: Dec. 6, 2010
(Under 37 CFR 1.47)

(65) Prior Publication Data
US 2014/0105402 A1 Apr. 17, 2014

(51) Int. Cl.
*G06F 12/14* (2006.01)
*H04L 9/08* (2006.01)

(52) U.S. Cl.
CPC .......................................... *H04L 9/08* (2013.01)
USPC ................ 713/189; 380/1; 380/282

(58) Field of Classification Search
CPC ...................... G06F 2221/2107; G06F 21/602
See application file for complete search history.

(56) References Cited

U.S. PATENT DOCUMENTS

| | | | |
|---|---|---|---|
| 5,321,665 A * | 6/1994 | Balistreri et al. | 365/230.05 |
| 6,295,606 B1 * | 9/2001 | Messerges et al. | 713/189 |
| 8,422,668 B1 * | 4/2013 | Thichina | 380/28 |
| 2002/0094085 A1 * | 7/2002 | Roberts | 380/262 |
| 2006/0130021 A1 * | 6/2006 | Plum et al. | 717/140 |
| 2008/0165961 A1 * | 7/2008 | Lerouge et al. | 380/202 |
| 2008/0304659 A1 * | 12/2008 | Ozturk et al. | 380/44 |
| 2010/0067702 A1 * | 3/2010 | Kusakawa et al. | 380/282 |

* cited by examiner

*Primary Examiner* — Andrew Nalven
*Assistant Examiner* — Meng Li
(74) *Attorney, Agent, or Firm* — Adeli LLP

(57) ABSTRACT

In the data security field, a data protection process embodied in a computer system or computing device or equivalent and which securely descrambles protected (scrambled) data. The process descrambles the data using a dynamic process employing a set of multi-level trees of deterministic functions to generate a descrambling mask value and recover the descrambled message.

31 Claims, 5 Drawing Sheets

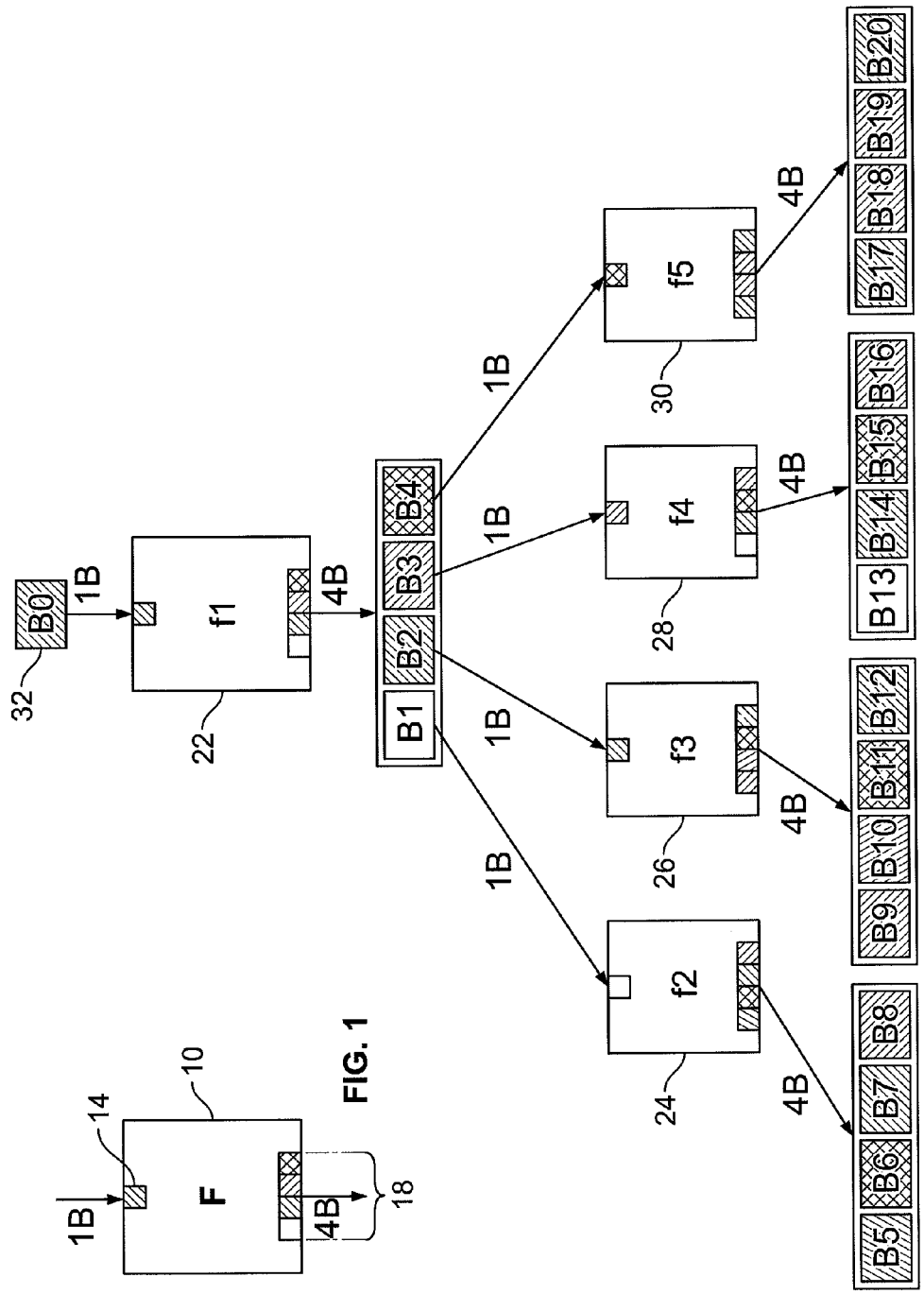

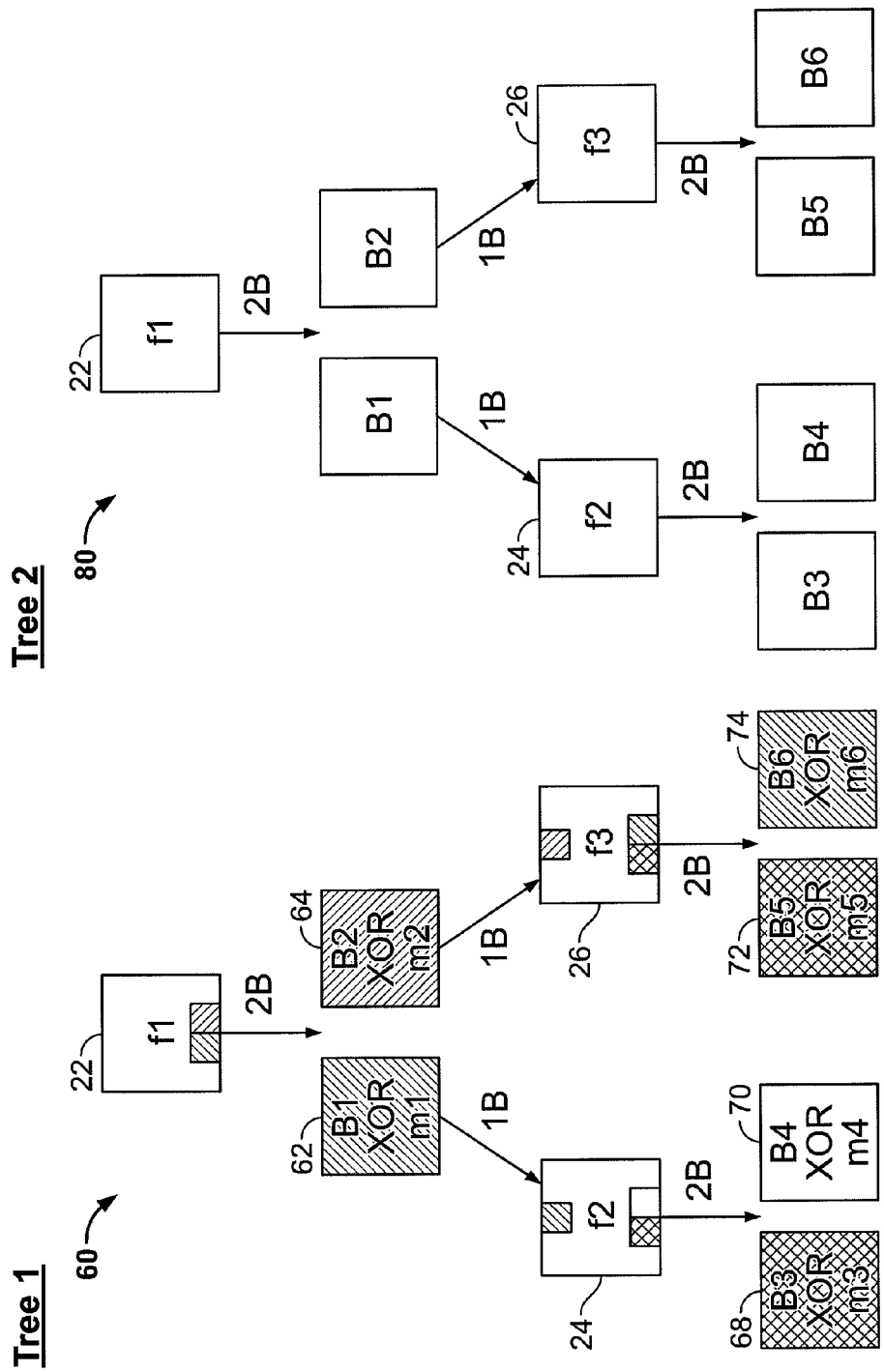

DATA PROTECTION USING KEY TRANSLATION

FIELD OF THE INVENTION

This invention relates to data security, cryptography, and more specifically to data protection such as scrambling and descrambling.

BACKGROUND

In the field of cryptography and data security, in addition to conventional ciphers it is known to protect (scramble) data (referred to here as a "message") by applying the data and a "key" or "mask" to a logical function that is invertible and commutative such as, for example, an XOR (exclusive OR) operation. This yields a randomly scrambled (protected) version of the message. Unscrambling involves applying the same key and the scrambled message to the same operation, thereby recovering the original message. Such data is conventionally in digital (binary) form.

Such data protection is considered much weaker than encryption since the only security lies in the key itself (which may be used repeatedly), and so is normally not employed by itself.

SUMMARY

In accordance with the present method, the above type of scrambling is used in a dynamic fashion to provide data security. While the resulting system by itself is not as secure as many encryption systems, it does provide a certain level of security and moreover is highly efficient computationally, and so is suitable for use in, e.g., consumer electronic devices such as video/audio players. For instance, it may be used in a content protection system as used to protect downloaded video and audio programs or items. Data protection as disclosed here includes situations such as transmitting information content or other types of (data) from a first entity such as a server to a second entity such as a client (or vice-versa) over a computer or other network (such as the Internet) as well as protecting data stored in a single device (platform).

In the following description of one example, the present method is used in conjunction with (on top of) conventional encryption and decryption, but this is not intended to be limiting since the present method is operative on its own to provide a certain level of data security, e.g., to a plaintext message after it is decrypted. For instance, this method may be combined with key representation.

In the encryption phase, the original plaintext digital data (which may be text, audio, video, numbers, etc.) is first expanded in length to become what is referred to in the field as a message "blob". The message is thereby masked using a Boolean or other type of mask. For instance, the message blob is generated by a logical XOR operation performed on the original message. A "blob" is, as well known in the field, the modified form of some input data (such as a message or a cryptographic key) that has been modified to enhance its security by some sort of conversion process. For instance, if a cryptographic key itself is encrypted for transmission, the encrypted key is referred to as a "key blob." The message blob is then conventionally encrypted and stored or transmitted to a recipient. The present approach may be used in combination with conventional ciphers of various well known types such as DES, AES, etc. Since the present approach is a method of masking data, it is independent of the encryption method. The present approach may be used in conjunction with various ciphers in the decryption phase after decryption to maintain data security.

In one example which is for use in combination with the AES cipher and so is not limiting, the message blob is a non-16 B (byte) long representation of a 16 B long message. This representation of the message then more generally is generated by a first process, e.g. at an entity referred to here as a server, then encrypted and sent or provided to another entity referred to here as a client. A second process, e.g. at the client, decrypts the message blob.

The present inventors have determined a need for a better process to protect (scramble) the message after its decryption and before it is used later on. It is known to protect the message by applying an intermediate (e.g., 16 B long) Boolean key (mask). In the first step, after decryption, one masks (e.g., logically XOR's) a Boolean key (mask) designated here $K_A$ with the decrypted message blob. $K_A$ in this example is a 16 B Boolean key (mask), determined, e.g., at compilation time. The second step after decryption expects the message blob to have a different Boolean key (mask), designated here $K_B$. The value of key (mask) $K_B$ is also determined e.g. at compile time. A translation step between $K_A$ and $K_B$ removes and applies the appropriate key (mask). It is known to do the translation using a set of lookup tables computed at code compile time that are used to remove and apply Boolean keys (masks) via a table lookup process. $K_A$, $K_B$ and the translation process between these two values make up the intermediate data transform protection for the message.

References here to "compile time" and "run time" assume the present method is conventionally carried out by computer code (software) executed on a computing device and which is initially compiled, such as from source code, to provide object (binary) code, then the object code is executed (at runtime) on the actual data such as the message. So more generally "compile time" or "compilation time" here refer to being determined prior to the actual message processing.

Keys (masks) $K_A$, $K_B$ and the translation process between these two keys (masks) make up the data transformation protection for the message. The present method's translation process is intended to be computationally efficient and more secure than the above look up table approach.

BRIEF DESCRIPTION OF THE FIGURES

FIG. 1 shows graphically operation of a single expansion function.

FIG. 2 shows graphically operation of a set of expansion functions.

FIG. 3 shows graphically a first "tree" of expansion functions.

FIG. 4 shows graphically a second "tree" of expansion functions.

DETAILED DESCRIPTION

Figure 5:
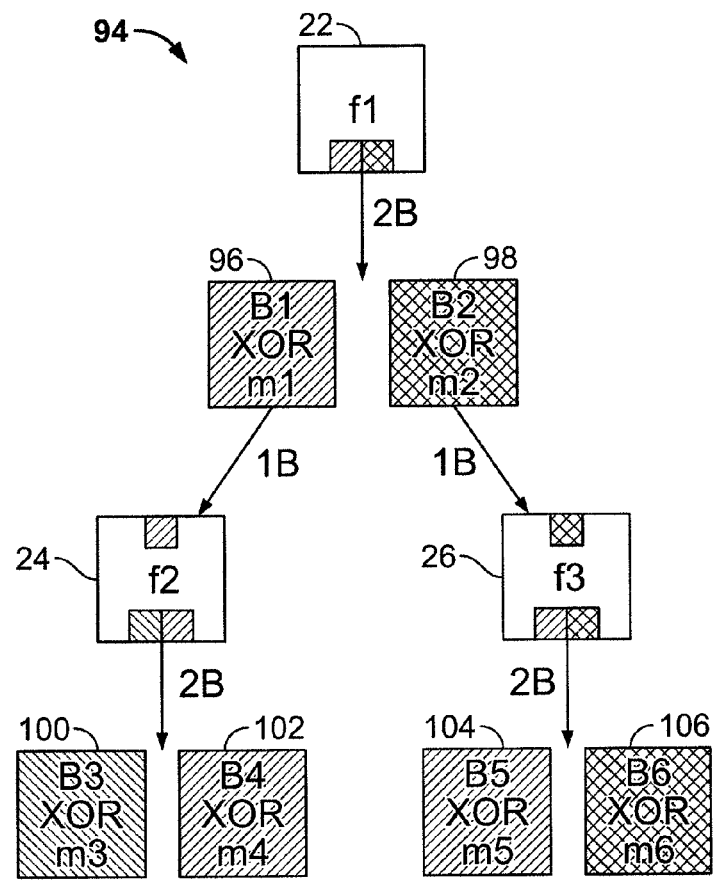
FIG. 5 shows graphically a third "tree" of expansion functions.

In one example, a deterministic (in one example, also one-way) expansion function designated F is provided which expands a value expressed as $Z/_{(256)}$ (meaning the value of Z is a group of integers in the range 0 to 255) into value $(Z/_{(256)})^n$ such that (expressed algebraically) $F(X)=$ $(B_1, \ldots, B_n)$ where X is a member of $Z/_{(256)}$ and $B_i$ is also a member of $Z/_{(256)}$. The "^" operator indicates to the power of so $Z/_{(256)}{}^{\wedge}n = Z/_{(256)} * Z/_{(256)} * \ldots Z/_{(256)}$, and B designates a data byte. F is a family of such expansion functions which take an input byte and output a set of bytes.

The implementation of each member of expansion function F thereby accepts an incoming 1 B (byte) long input value ("key" or "mask") and outputs an n-byte long output value, such that if m is the input value corresponding to $K_A$ above and $M=(M_1, \ldots, M_n)$ is the output key (mask) value corresponding to $K_B$ above, then expressed algebraically:

$$F(m(X)) = (M_1(B_1), \ldots, M_n(B_n)),$$

where m(X) means applying mask m to data X.

The resulting mask M values ("keys") may be the identity, i.e. the same. These values of function family F are referred to here as "keys" because in one example they are used as described below as descrambling "keys" or "masks" to unscramble the message. Functions which are members of F are conventional relatively secure (one-way) expansion functions such as a pseudo random number generator, where the input value is the generator seed and the output value is the resulting pseudo random number.

In FIG. 1, consider function family F 10, having expansion factor n=4, so input value 14 is 1 byte long and the resulting output value 18 is 4 bytes long as indicated by the shading. Given a member of F, designated f, if one varies the input value 14 for function f then one can vary the output value of function f. If one chains (concatenates) several members f of F, and varies the masks, one can vary the output of the f functions in many controllable ways which appear random to an attacker, making an attack much more difficult.

In FIG. 2, consider $f_1$ 22, $f_2$ 24, $f_3$ 26, $f_4$ 28, and $f_5$ 30 all of which are members of family F and chained (arranged in sequential layers) together as shown, with n=4 for each function $f_i$. The chain starts with a byte B0 32 as the input mask value (key) and outputs bytes B1 through B20 by expansion.

The operation of FIG. 2 is employed at two different times in the present data protection method. The first is at compilation time to determine the compile time (initial) mask value m (also referred to as $K_A$). The second is at run time when the actual message is processed similarly to determine a run time mask value M (also referred to as $K_B$). If one uses the output mask values (keys) of $f_2, f_3, f_4$, and $f_5$ of FIG. 2 to be Boolean values at compile time to be the 16 byte Boolean values equal to the concatenation of the output values of $f_2, f_3, f_4$, and $f_5$ (B5, ..., B20), then later by logically combining (e.g., XOR-ing) bytes B5 through B20 at run time with the message blob, this process implicitly removes from the message blob the compile time output mask value m ($K_A$) and applies the new run time 16 byte Boolean mask value M ($K_B$) which is also defined as (B5, ..., B20).

Consider a deterministic permutation operation (function) designated g as described above which is expressed as $Z/_{(256)} \to Z/_{(256)}$ so both the input and output are $Z/_{(256)}$, such that g(X)=B. Let X be the seed to function g.

The first round of the method is defined by g, $f_0, f_1, \ldots, f_{(n+n^2)}$ and will output bytes $B_0, B_1 \ldots B_{(n+n^2+n^3)}$ from the seed X, as follows:

$$B0 = g(X)$$

$$(B_{n^{\sim}i+1}, B_{n^{\sim}i+2}, B_{n^{\sim}i+3}, \ldots, B_{n^{\sim}(i+1)}) = f(B_i)$$

The above construction is depicted graphically as a "tree" structure 40 in FIG. 2 with depth 3. If n=4, and one extends the tree structure of FIG. 2 by one more level, this is an example of the first round of the present method. There is nothing unique about a tree with a depth of three levels, which is only illustrative.

This tree structure provides several advantages. The first is efficient random access—generating one output byte should take about the same time as generating any other output byte. Second, it is easily updatable—the building blocks of the tree structure have a "plug-and-play" property so that one may employ a different set of building blocks function (f's) and thus the attacker will see a completely different process at each attack.

The tree structure thereby allows generating a byte $B_i$ with minimum dependency on previous generated bytes of index less than i. This process is easily updatable because any function $f_i$ can be taken out of the tree and replaced by a new member of family F. Moreover, if one permutes the functions $f_i$'s and changes the input and output keys of each $f_i$ then one gets a new behavior in the output of the tree structure. This ability to "plug and play" the functions $f_i$ combined with the ease of changing their input and output keys gives a very flexible method. The advantage of flexibility offered by the functions $f_i$ such as a recursive implementation extends also to the size of the implementation in terms of adding rounds.

The method allows for any number of additional rounds in the tree. Let $X_0 = x$ designate the incoming seed for the first round. To "jump start" the ith round, compute $h(X_{i-1}) = X_i$ where h is a deterministic permutation such that h: $Z/_{(256)} \to Z/_{(256)}$. Given $X_i$, apply it to the above method to recover the next batch of bytes.

The above gives an efficient way to translate between the compile time initial (e.g., 16 byte) output key (mask) $K_A$ to a new (and typically longer) per byte key (mask) $K_B$ for run time (message processing) that may be as long as the message blob. This is inherently more secure since in this context the length of the key (mask) is the chief determinant of security. One can apply this mask translation immediately after decryption of the message blob, as described above.

The following detailed example explains how three instances of the function tree facilitate the above key mask translation. For simplicity, assume the plaintext digital message designated t to be protected is 3 bytes long where each byte is designated $t_i$, so the message is three concatenated bytes expressed algebraically, where the commas indicate concatenation, as:

$$[t_1, t_2, t_3]$$

On the first process, e.g. server side, this 3 byte long message is conventionally transformed into a message blob. For simplicity, assume the blob transformation algorithm takes each message byte $t_1$ and splits it in two bytes designated $ti_1$, $ti_2$ by a bitwise XOR operation, indicated here by the operator "⊕", so the message blob is expressed as:

$$[t_{11}, t_{12}, t_{21}, t_{22}, t_{31}, t_{32}]$$

Where the transformation is such that:

$$t_1 = t_{11} \oplus t_{12},$$

$$t_2 = t_{21} \oplus t_{22},$$

and $$t_3 = t_{31} \oplus t_{32}$$

After this transformation of t, the resulting message blob is conventionally encrypted as described above and provided or communicated to the second process, e.g. at a client.

The client (or equivalent) first conventionally decrypts the message blob and then applies the decrypted message blob and a per byte initial Boolean key M to an XOR operation on a byte-byte basis so as to provide the following as output:

$$[(t_{11} \oplus m_1),(t_{12} \oplus m_2),(t_{21} \oplus m_3),(t_{22} \oplus m_4),(t_{31} \oplus m_5), (t_{32} \oplus m_6)]$$

where $m_i$'s make up the compile time key (also called $K_A$) for the first step as described above.

Suppose that when one reconstructs the actual 3 byte message t, the second process (the client) expects the following as a message input:

$$[(t_1 \oplus M_1),(t_2 \oplus M_2),(t_3 \oplus M_3)]$$

where the $M_i$ bytes make up key $K_B$, which is the run time key expected by the second step.

To apply the correct key translation consider the following three exemplary tree structures. In FIG. 3, as shown the first tree 1 construction 60 has the $m_i$'s, i.e. the compile time key $K_A$, embedded in the tree structure. In addition to the $f_i$ expansion functions chained together here as in FIG. 2, the various XOR operations 62, 64, 64, 68, 70, 72, 74 apply the 2 byte long output of each $f_i$ function to an XOR operation together with the compile time key bytes respectively $m_1, m_2, m_3, m_4, m_5, m_6$ shown shaded. Note that here the f expansion factor n is equal to 2, not 4 as in FIG. 2.

In FIG. 4, the second tree 2 80 has no keys embedded but replicates FIG. 3 in terms of the f tree structure.

In FIG. 5, the third tree 3 94 has the $M_i$'s, i.e. the run time key bytes $K_B$, embedded in the tree structure at each of the XOR operations 96, 98, 100, 102 104, 106.

Given as stated above the message blob expressed as:

$$[(t_{11} \oplus m_1),(t_{12} \oplus m_2),(t_{21} \oplus m_3),(t_{22} \oplus m_4),(t_{31} \oplus m_5), (t_{32} \oplus m_6)]$$

The first step is to remove the $m_i$'s, the compile time key $K_A$ in the first step, and one does this using tree 1.

Thus for each 4 byte masked by one of the $m_i$'s one logically XORs the appropriate byte computed by tree 1 as follows:

$$(t_{11} \oplus m_1) \oplus (B_1 \oplus m_1) \to (t_{11} \oplus B_1)$$
$$(t_{12} \oplus m_2) \oplus (B_2 \oplus m_2) \to (t_{12} \oplus B_2)$$
$$\ldots$$
$$(t_{32} \oplus m_6) \oplus (B_6 \oplus m_6) \to (t_{32} \oplus B_6)$$

to effectively transform expression:

$$[(t_{11} \oplus m_1),(t_{12} \oplus m_2),(t_{21} \oplus m_3),(t_{22} \oplus m_4),(t_{31} \oplus m_5), (t_{32} \oplus m_6)]$$

into expression:

$$[(t_{11} \oplus B_1),(t_{12} \oplus B_2),(t_{21} \oplus B_3),(t_{22} \oplus B_4),(t_{31} \oplus B_5), (t_{32} \oplus B_6)]$$

If at this point one tries to reconstruct the original message $[t_1, t_2, t_3]$, one obtains the following from the previous expression:

$$[(t_1 \oplus B_1 \oplus B_2),(t_2 \oplus B_3 \oplus B_4),(t_3 \oplus B_5 \oplus B_6)]$$

but instead one needs this expressed in terms of the run time key $K_B$:

$$[(t_1 \oplus M_1),(t_2 \oplus M_2),(t_3 \oplus m_3)]$$

thus the message bytes are so far incorrectly masked. To correct the key (that is to be the run time key M), one uses tree 2 and tree 3 as follows:

Take $t_1$, the first message byte. Its representation above is:

$$[(t_{11} \oplus B_1),(t_{12} \oplus B_2)]$$

and one needs:

$$[(t_1 \oplus M_1)]$$

To correct the key:
Use tree 2 to generate $B_2$
Use tree 3 to generate $B_1 \oplus M_1$
Then compute:

$$(t_{11} \oplus B_1) \oplus (t_{12} \oplus B_2) \oplus B_2 \oplus (B_1 \oplus M_1) \to (t_1 \oplus M_1),$$

thereby recovering message byte $t_1$.

A similar approach is taken to recover the remaining message bytes $t_2$ and $t_3$. This example can be extended to the case where the message t is of variable length which is often the case in practice. Note that the message may be conventionally padded to be an integer length expressed in bytes. Also while a byte length approach is used here, this is not limiting—the method is operative on data portions of other length, such as blocks of any convenient length. Note also that use of the XOR operation here is not limiting; one may substitute any invertible commutative operation.

Figure 6:
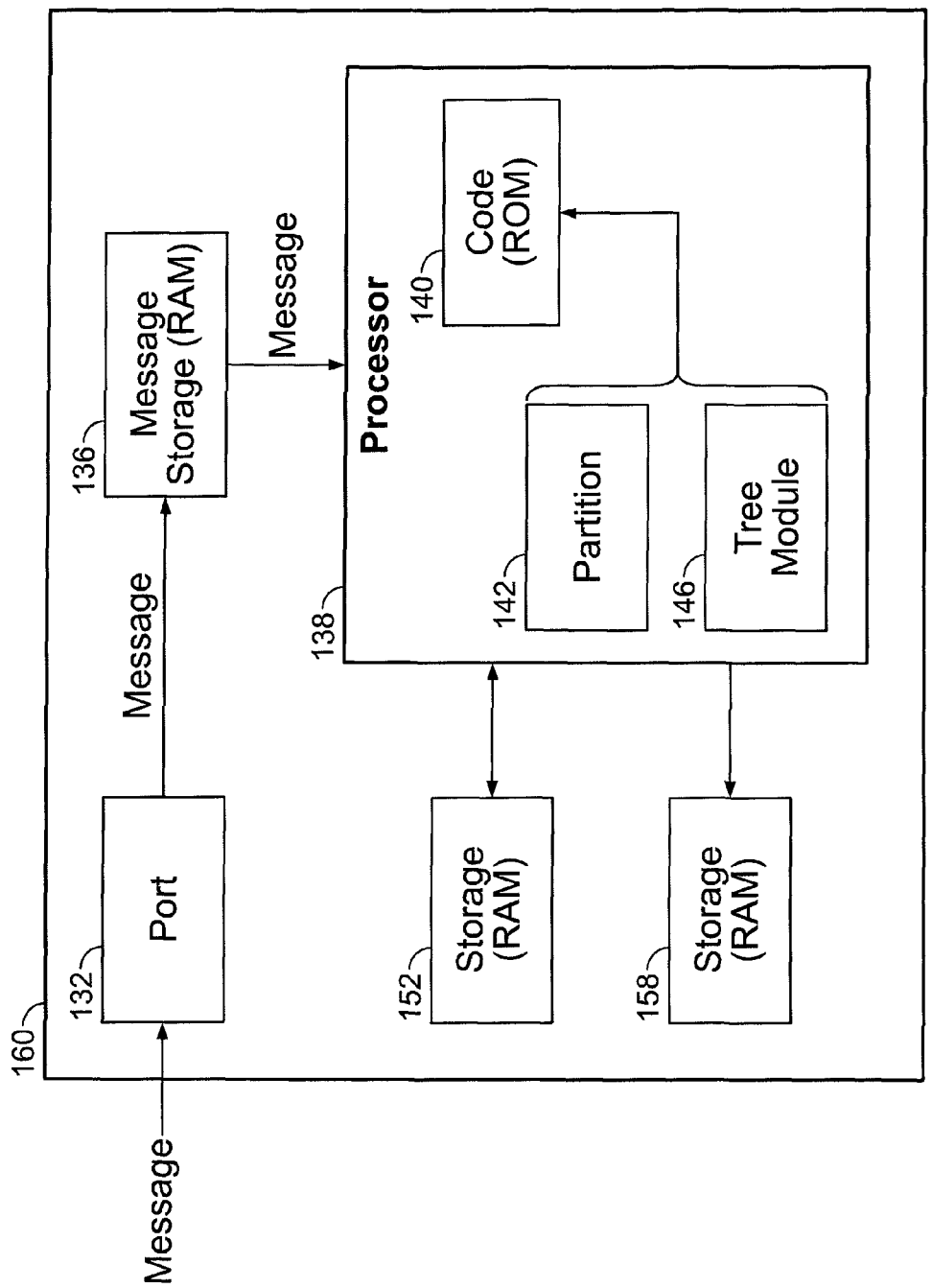
FIG. 6 shows in a block diagram relevant portions of a computing device (system) to carry out the present method.

FIG. 6 shows in a block diagram relevant portions of a computing device (system) 160 in accordance with the invention which carries out the message recovery process as described above. This is, e.g., a server platform, computer, mobile telephone, Smart Phone, personal digital assistant or similar device, or part of such a device and includes conventional hardware components executing in one embodiment software (computer code) which carries out the above code examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Not shown is the somewhat similar apparatus which encrypts and protects message, but which is largely similar and may indeed be part of the same platform.

The computer code is conventionally stored in code memory (computer readable storage medium) 140 (as object code or source code) associated with conventional processor 138 for execution by processor 138. The incoming message (in digital form) is received at port 132 and stored in computer readable storage medium (memory) 136 where it is coupled to processor 138. Processor 138 conventionally decrypts the message then partitions the message into suitable sized blocks (or bytes) at partitioning module 142. Another software (code) module in processor 138 is the tree module 146 which carries out the mask translation functionality and the $f_i$ functions set forth above with its associated (memory) 152.

Also coupled to processor 138 is a computer readable storage medium (memory) 158 for the resulting reconstructed plaintext message. Storage locations 136, 140, 152, 158 may be in one or several conventional physical memory devices (such as semiconductor RAM or its variants or a hard disk drive).

Electric signals conventionally are carried between the various elements of FIG. 6. Not shown in FIG. 6 is the subsequent conventional use of the resulting message stored in storage 145.

Figure 7:
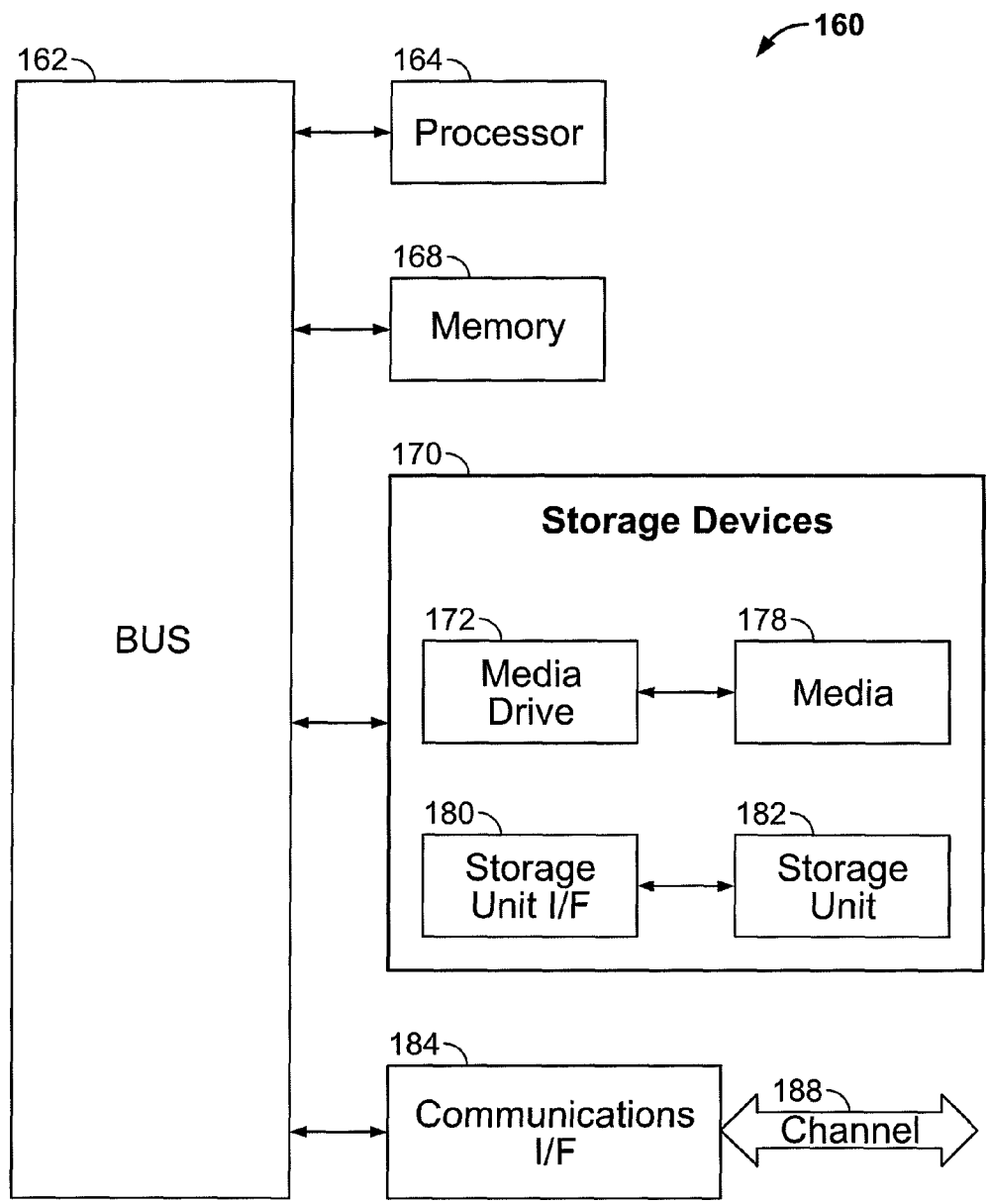
FIG. 7 shows in a block diagram further detail of the FIG. 6 system.

FIG. 7 shows further detail of the FIG. 6 computing device in one embodiment. FIG. 7 illustrates a typical and conventional computing system 160 that may be employed to implement processing functionality in embodiments of the invention and shows additional detail of the FIG. 6 system.

Computing systems of this type may be used in a computer server or user (client) computer or other computing device, for example. Those skilled in the relevant art will also recognize how to implement embodiments of the invention using other computer or computing systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 6). Processor 164 can be implemented using a general or special purpose processing engine such as, for example, a microprocessor, microcontroller or other control logic. In this example, processor 164 is connected to a bus 162 or other communications medium. Note that in some embodiments the present process is carried out in whole or in part by "hardware" (dedicated circuitry) which is equivalent to the above described software embodiments.

Computing system 160 can also include a main memory 168 (equivalent to memories 136, 140, 152, 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 172. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to port 132 in FIG. 6). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications and improvements will be apparent to these skilled in the art in light of this disclosure and are intended to fall within the scope of the appended claims.

We claim:

1. A method for recovering expanded data, the method comprising:
    receiving data in an expanded form;
    masking the data using a previously-generated first mask value and a first invertible logical function to produce an initial masked data value;
    after masking the data, generating a second mask value by sequentially using a set of predetermined logical tree structures, each of the logical tree structures defined by a plurality of expansion functions, wherein the first logical tree structure includes the first mask value and a last of the sequentially-used logical tree structures provides the second mask value; and
    applying the second mask value to the initial masked data value using a second invertible logical function in order to recover the data in non-expanded form as masked by the second mask value.

2. The method of claim 1 further comprising decrypting the received data before masking the data using the previously-generated first mask value.

3. The method of claim 1, wherein each of the expansion functions expands a length of an input to the expansion function by a factor of two or more.

4. The method of claim 1, wherein the expansion functions are each a pseudo random number generator.

5. The method of claim 1, wherein the first invertible logical function and the second invertible logical function are commutative.

6. The method of claim 2, wherein decrypting the received data comprises applying at least one of a public key/private key and a symmetric cipher decryption.

7. The method of claim 1, wherein the previously-generated first mask value is generated at a code compilation time.

8. The method of claim 1, wherein the set of predetermined logical tree structures comprises at least three logical tree structures, each logical tree structure having at least three levels.

9. The method of Claim 8, wherein a second of the logical tree structures includes no mask values.

10. The method of claim 1, wherein the received data comprises computer code, the previously-generated first mask value is determined during the compilation of the code, and the second mask value is determined during the execution of the compiled code.

11. The method of claim 1, wherein each portion of the data is one of a byte, a word, and a block of digital data.

12. The method of claim 1, wherein the data is scrambled digital data.

13. The method of claim 1, wherein the data is a message blob which is longer than an original of a message and the second mask value has the same length as the original of the message.

14. The method of claim 1, wherein the method is carried out by computer code stored on a computer readable medium.

15. A non-transitory machine readable medium storing a program which when executed by at least one processing unit recovers expanded data, the program comprising sets of instructions for:
  receiving data in an expanded form;
  masking the data using a previously-generated first mask value and a first invertible logical function to produce an initial masked data value;
  after masking the data, generating a second mask value by sequentially using a set of predetermined logical tree structures, each of the logical tree structures defined by a plurality of expansion functions, wherein the first logical tree structure includes the first mask value and a last of the sequentially-used logical tree structures provides the second mask value; and
  applying the second mask value to the initial masked data value using a second invertible logical function in order to recover the data in non-expanded form as masked by the second mask value.

16. The non-transitory machine readable medium of claim 15, wherein the program further comprises a set of instructions for decrypting the received data before masking the data using the previously-generated first mask value.

17. The non-transitory machine readable medium of claim 15, wherein the expansion functions are each a pseudo random number generator.

18. The non-transitory machine readable medium of claim 15, wherein the received data comprises computer code, the previously-generated first mask value is determined during the compilation of the code, and the second mask value is determined during the execution of the compiled code.

19. An apparatus for recovering expanded data, the apparatus comprising:
  at least one processing unit and
  a machine readable storage for storing a program, the program for execution by the processing unit, the program comprising sets of instructions for:
    receiving data in an expanded form;
    masking the data using a previous-generated mask value and a first invertible logical function to produce an initial masked data value;
    after masking the data, generating a second mask value by sequentially using a set of predetermined logical tree structures, each of the logical tree structures defined by a plurality of expansion functions, wherein the first logical tree structure includes the first mask value and a last of the sequentially-used logical tree structures provides the second mask value; and
    applying the second mask value to the initial masked data value using a second invertible logical function in order to recover the data in non-expanded form as masked by the second mask value.

20. The apparatus of claim 19, wherein the program further comprises a set of instructions for decrypting the received data before masking the data using the previously-generated first mask value.

21. The apparatus of claim 19, wherein each of the expansion functions expands a length of an input to the expansion function by a factor of two or more.

22. The apparatus of claim 19, wherein the expansion functions are each a pseudo random number generator.

23. The apparatus of claim 19, wherein the first invertible logical function and the second invertible logical function are commutative.

24. The apparatus of claim 20, wherein the set of instructions for decrypting the received data comprises a set of instructions for applying at least one of a public key/private key and a symmetric cipher decryption.

25. The apparatus of claim 19, wherein the previously-generated first mask value is generated at a code compilation time.

26. The apparatus of claim 19, wherein the set of predetermined logical tree structures comprises at least three logical tree structures, each logical tree structure having at least three levels.

27. The apparatus of Claim 26, wherein a second of the logical tree structures includes no mask values.

28. The apparatus of claim 20, wherein the apparatus executes compiled computer code, and the previously-generated first mask value is determined during compilation of the code and the second mask value is determined during the execution of the compiled code.

29. The apparatus of claim 19, wherein each portion of the data is one of a byte, a word, and a block of digital data.

30. The apparatus of claim 19, wherein the data is digital data.

31. The apparatus of claim 19, wherein the data is a message blob which is longer than an original of a message and the second mask value has the same length as the original of the message.

* * * * *